INVENTOR
Normand Bergeron

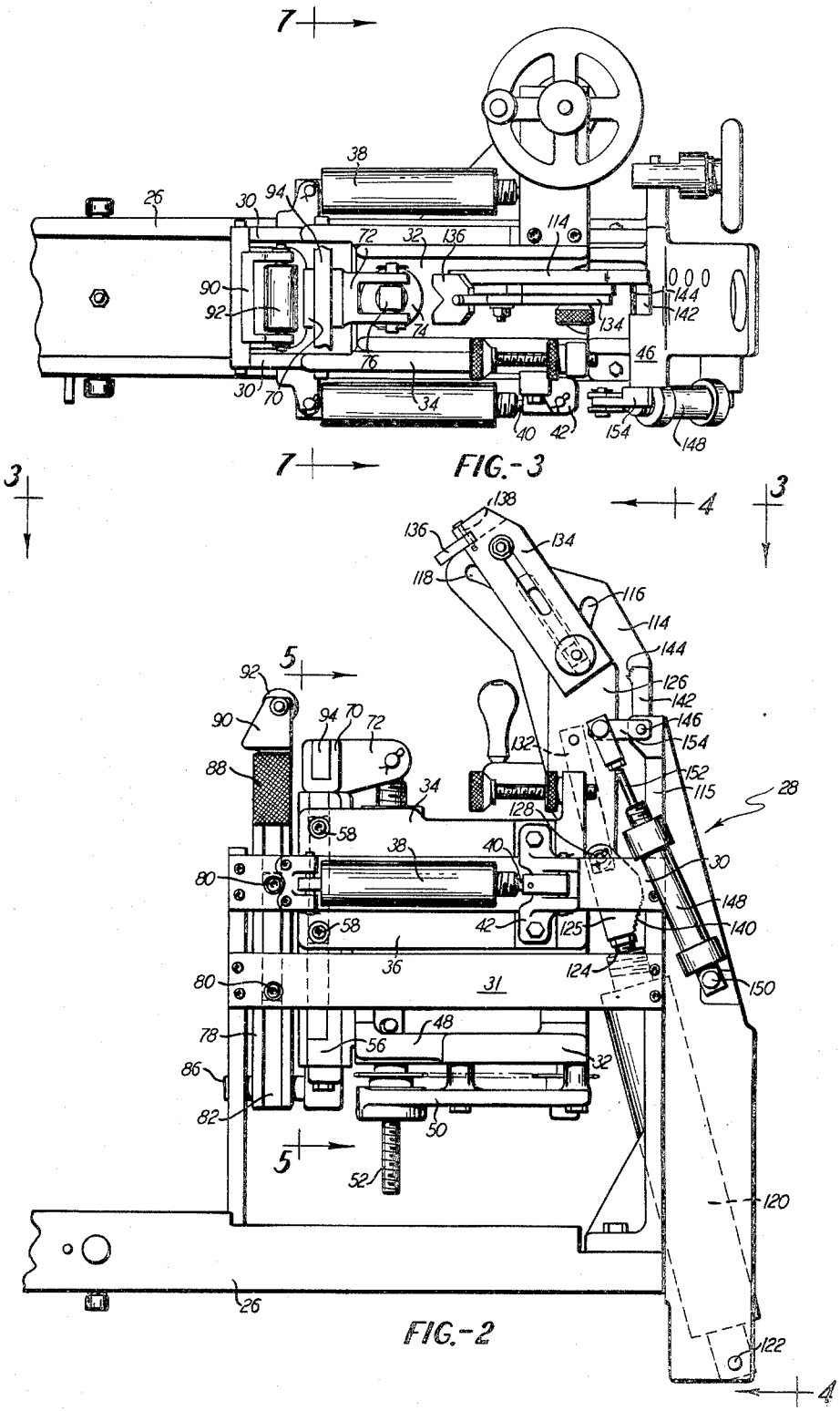

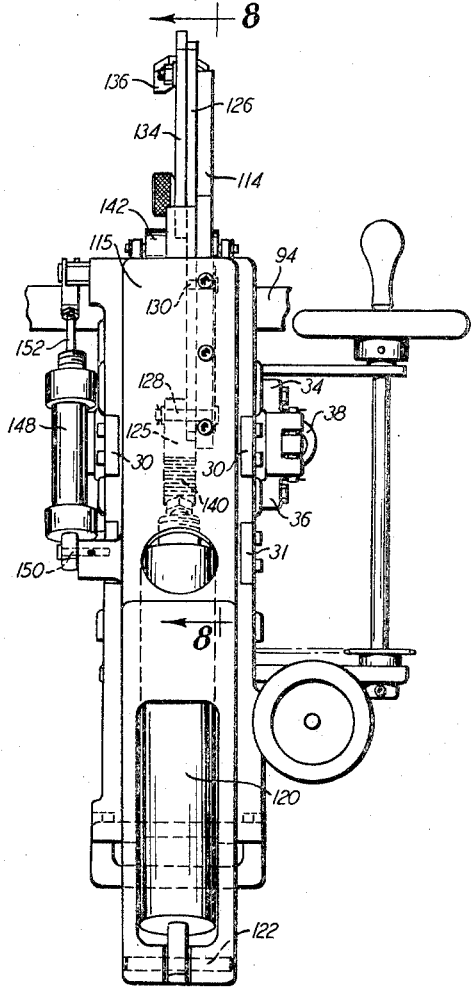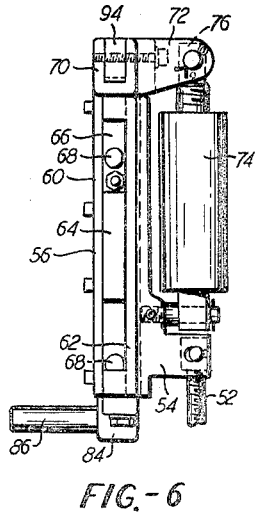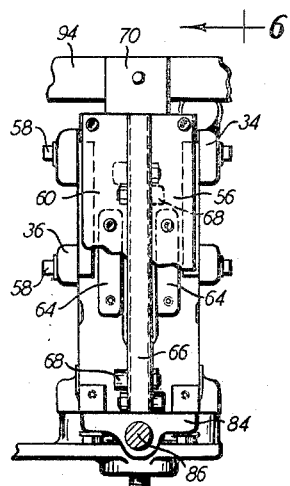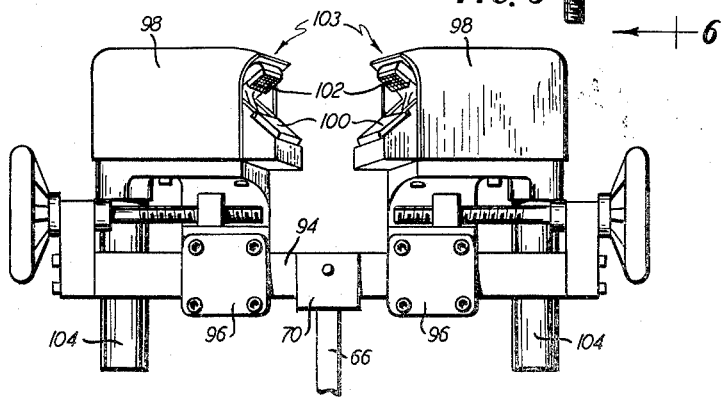

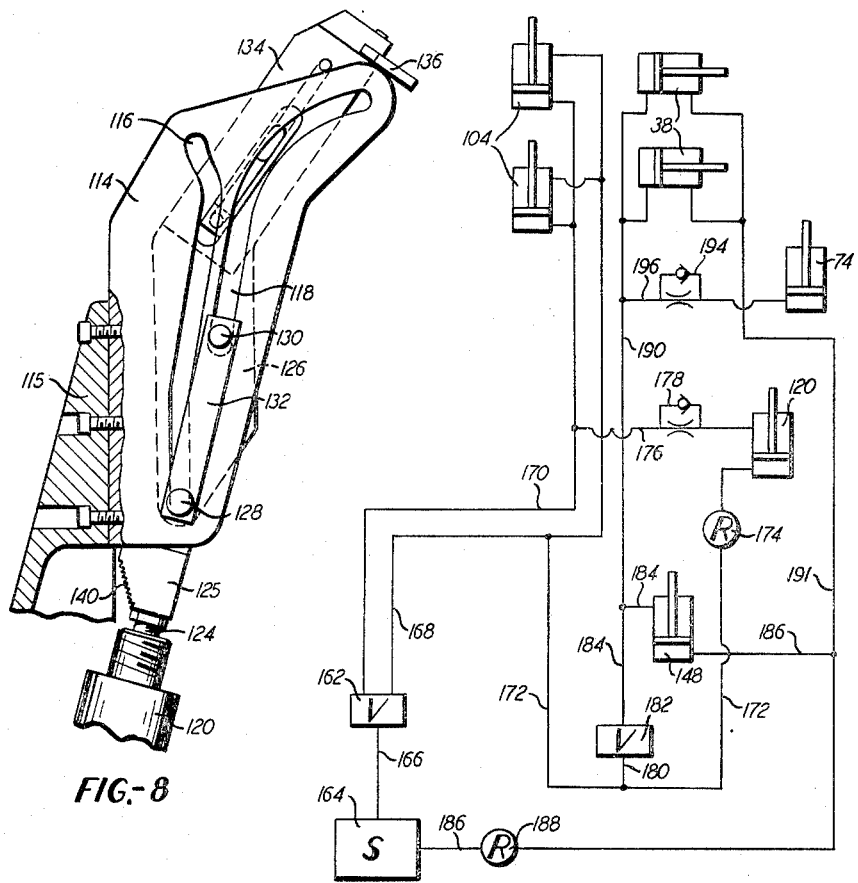
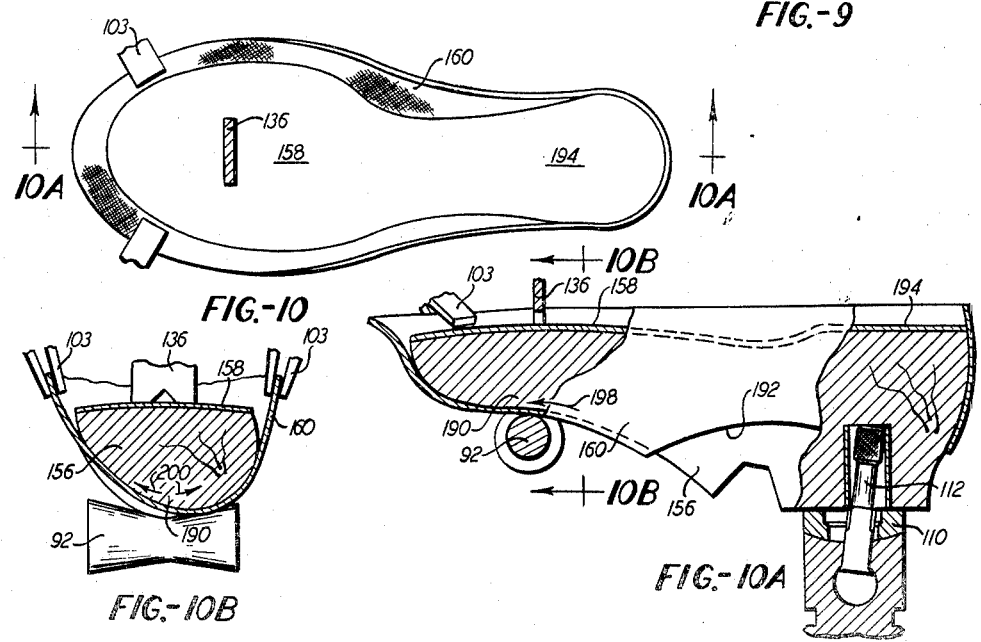

United States Patent Office 3,484,880
Patented Dec. 23, 1969

1

3,484,880
STRETCHING AN UPPER ABOUT A LAST
Normand Bergeron, Montreal, Quebec, Canada, assignor to Jacob S. Kamborian, West Newton, Mass.
Filed Nov. 17, 1967, Ser. No. 683,939
Int. Cl. A43d 31/00, 23/00
U.S. Cl. 12—145                     22 Claims

ABSTRACT OF THE DISCLOSURE

There is disclosed herein a machine for stretching a shoe upper about a last that comprises a pair of pincers that grip the forepart portions of the margin of the upper. Separate air operated motors are connected to the pincers to yieldably move the pincers toewardly and upwardly. A toe hold-down is incorporated in the machine that is moved against the forepart of the insole and is locked against upward movement.

This invention is concerned with operating on a shoe assembly comprising a last having an upper draped thereon and an insole located on its bottom by stretching the upper about the last prior to wiping the margin of the upper against the insole. The shoe assembly is mounted bottom-up on a support arrangement and a toe rest supports the forepart portion of the shoe assembly to bear against the forepart portion of the upper. During the stretching operation, the upper should shift between the toe rest and the last.

In accordance with one aspect of the invention, a toe hold-down is provided that is moved against the forepart of the insole and is locked against upward movement in such a manner that it does not apply a downward force to the insole that is great enough to bind the forepart of the upper margin against the toe rest. Therefore the upper can shift between the last and the toe rest during the stretching operation while the hold-down prevents the last from moving.

In accordance with a second aspect of the invention, the stretching operation is performed by gripping means that grip the upper margin and are moved by separate yieldable drive means upwardly and toewardly to the extent permitted by the resistance to stretching of the shoe assembly.

Figure 1:
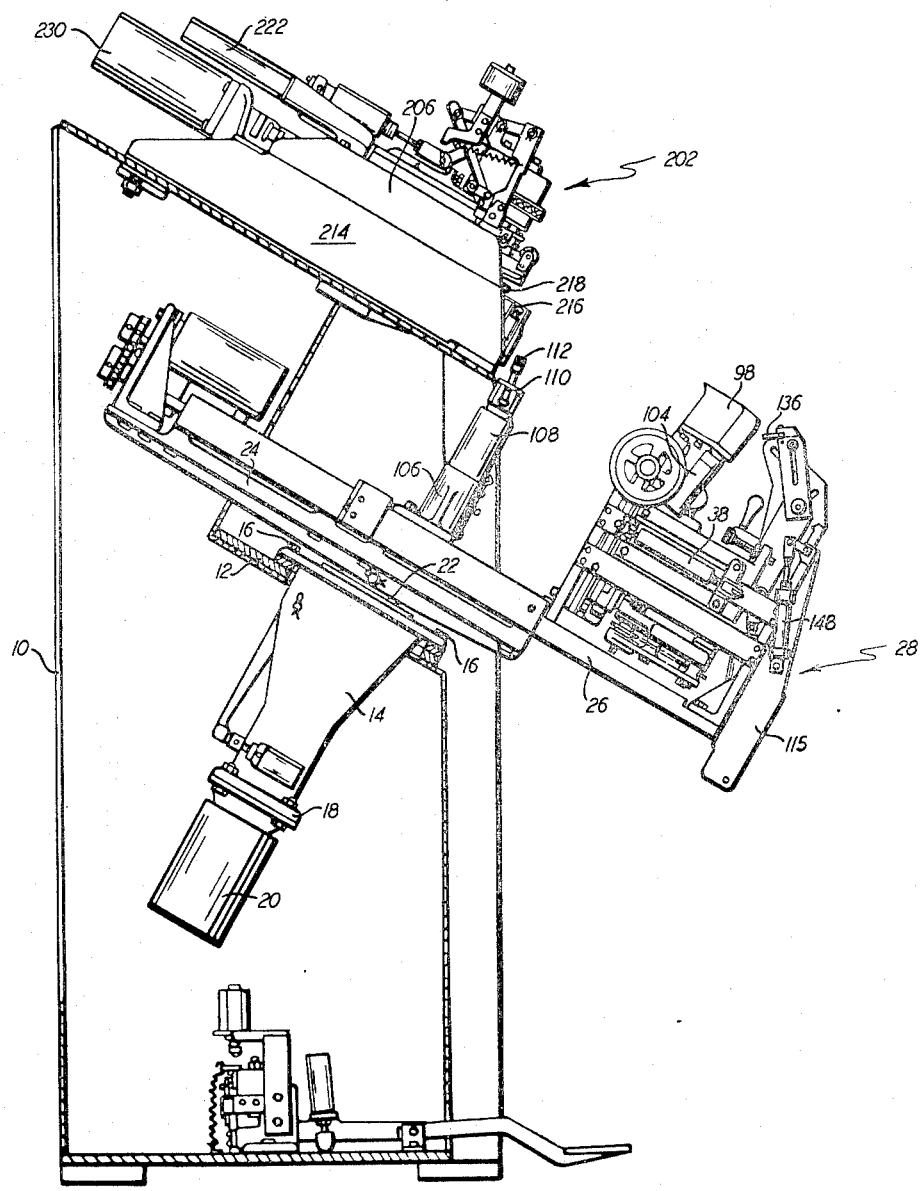

In the drawings:
FIGURE 1 is a side elevation of a machine for practicing the invention;
FIGURE 2 is a side elevation, to a large scale, of the front of the machine;
FIGURE 3 is a view taken on the line 3—3 of FIGURE 2;
FIGURE 4 is a view taken on the line 4—4 of FIGURE 2;
FIGURE 5 is a view taken on the line 5—5 of FIGURE 2;
FIGURE 6 is a view taken on the line 6—6 of FIGURE 5;
FIGURE 7 is a view taken on the line 7—7 of FIGURE 3;
FIGURE 8 is a view taken on the line 8—8 of FIGURE 4;
FIGURE 9 is a diagram of a portion of the control circuit of the machine;
FIGURE 10 is a representation of the shoe assembly as it appears in the machine during the stretching operation;
FIGURE 10A is a view taken on the line 10A—10A of FIGURE 10;
FIGURE 10B is a view taken on the line 10B—10B of FIGURE 10A; and

2

FIGURES 11-15 are representations of the shoe assembly as it appears in the machine subsequent to the stretching operation.

Referring to FIGURE 1, the machine includes a frame 10 that comprises a base 12 and a housing 14. The machine is tilted about 30 degrees to enable the operator to have ready access thereto. For ease of explanation, the direction of the base 12 will be referred to as horizontal and the direction of the housing 14 will be referred to as vertical. In operating the machine, the operator stands to the right of the machine as seen in FIGURE 1, and parts moving toward the operator (left to right in FIGURE 1) will be described as moving forwardly while parts moving away from the operator (right to left in FIGURE 1) will be described as moving rearwardly.

The housing 14, which is secured to the base 12 by bolts 16, has a hanger 18 bolted to its bottom. An air operated motor 20, secured to the hanger 18, has a vertical piston rod (not shown) that extends upwardly into the housing 14. As shown more clearly in Patent No. 3,320,626, the piston rod of the motor 20 is connected to a post 22 that is slidably guided for vertical movement in the housing 14. The top of the post 22 is received in a socket in a shoe supporting platform 24. A base 26 is mounted to the platform 24 and extends forwardly thereof.

Referring to FIGURES 2-4, the front of the base 26 has a framework 28 extending upwardly thereof that includes on each side an upper horizontally extending bar 30 and a lower horizontally extending bar 31. A horizontal stretch carriage 32, located between the bars 30 and 31, is slidably mounted to the bars 30 for horizontal movement by means of flanges 34 and 36 on the carriage that respectively slidably engage the tops and bottoms of the bars 30. An air actuated motor 38 is pivotally connected to each bar 30, and each motor has a piston rod 40 that is connected to the carriage 32 by means of a bracket 42.

As shown in FIGURE 2, the carriage 32 includes a pair of spaced flanges 48 and 50. A stud 52, mounted to the flange 50, extends upwardly thereof through the flange 48. The top of the stud 52 is pinned to a clevis extension 54 (FIGURE 6) formed on a column 56, and the column 56 is mounted to the flanges 34 and 36 of the carriage 32 by pins 58 (FIGURE 5).

Referring to FIGURES 5 and 6, the column 56 is defined by spaced members 60 and 62 and a pair of guide bars 64. The guide bars 64 define a vertical guideway for a bar 66 that is slidably guided by rollers 68 mounted to the bar 66 with the rollers extending between the members 60 and 62. The top of the bar 66 is formed into a cup 70 having a clevis 72 extending forwardly thereof. An air actuated motor 74 is pinned to the clevis extension 54 to extend upwardly thereof, and the piston rod 76 of the motor 74 is pinned to the clevis 72.

A pillar 78 (FIGURE 2) is mounted for vertical movement in the framework 28 rearwardly of the column 56 by way of rollers that are rotatably mounted on pins 80 secured to the bars 30 and 31 and that are located in vertical slots 82 formed in the pillar 78. The column 56 has a cap 84 (FIGURES 5 and 6) bolted to its bottom and a prong 86 is secured to the cap 84 and extends rearwardly thereof slidably through the bottom of the pillar 78 (FIGURE 2). A collar 88 is mounted to the top of the top of the pillar 78 and a bracket 90 rests on the collar 88. A toe rest roller 92 is rotatably mounted on the bracket 90.

As shown in FIGURES 2, 3 and 5-7, a bar 94 is secured in the cup 70 and extends laterally thereof on both sides. A slide 96 (FIGURE 7) is mounted on the bar 94 on each side of the cup 70. A pincers housing 98 is secured to each slide 96. A statonary pincers jaw 100 and a movable pincers jaw 102 of a pincers 103 are mounted in each housing 98. An air operated motor 104 is mounted to each housing 98. The motors 104 are operatively connected by linkage shown in the aforementioned Patent No. 3,320,626 so as to move the pincers jaws 102 to and from the open position shown in FIGURE 7 and a closed position wherein they can grip work located between the jaws 100, 102.

Referring to FIGURE 1, the platform 24 has a base 106 secured thereto. A column 108 is secured to the base 106 and extends upwardly thereof. A shoe assembly support arrangement that comprises a supporting plate 110 and a last pin 112 are mounted to the top of the column 108 with the last pin 112 extending upwardly of the plate 110.

Referring to FIGURES 2–4 and 8, a housing 114, secured to a front bracket 115 of the framework 28, has a pair of cam tracks 116 and 118 formed therein. An air operated motor 120 is pivoted to the bottom of the front bracket 115 by a pin 122. The upwardly extending piston rod 124 of the motor 120 is secured to a block 125. The block 125 is pivoted by a pin 128 to a carrier 126 that is positioned alongside the housing 114. The pin 128 and a pin 130 respectively extend from the carrier 126 through the cam tracks 116 and 118 and are retained in the cam tracks by a strip 132. A holder 134 is adjustably secured to the top of the carrier 126. A toe hold-down 136 is pivoted to the top of the holder 134 by a pivot pin 138. Teeth 140 that extend forwardly of the block 125 form a locking surface. A locking member in the form of a pawl 142 has teeth 144 that are adapted to mesh with the teeth 140, as described below, to thereby lock the hold-down 136 against movement. The pawl 142 is secured to a pin 146 that is pivotally mounted in the bracket 115. An air operated motor 148, pivoted to the bracket 115 by a pivot pin 150, has an upwardly extending piston rod 152. The piston rod 152 is pivotally connected to a bar 154, and the bar 154 is secured to the pin 146.

In the idle condition of the machine: the piston rod of the motor 20 is retracted into this motor to maintain the last supporting plate 110, the last pin 112, the pincers 103 and the toe rest 92 in a lowered position; the piston rods 40 are retracted into the motors 38 to maintain the carriage 32 in a rearward position; the piston rod 76 is retracted into the motor 74 to maintain the pincers 103 in a lowered position with respect to the carriage 32; the piston rods of the motors 104 are projected out of these motors to maintain the pincers 103 open; the piston rod 124 is retracted into the motor 120 to maintain the hold-down 136 in a lowered and forward position; and the piston rod 152 is projected out of the motor 148 to maintain the pawl 142 in the vertical position shown in FIGURE 2 wherein it is disengaged from the teeth 140.

Referring to FIGURE 10, 10A and 10B, a shoe assembly is provided that comprises a last 156 having an insole 158 secured to its bottom and an upper 160 mounted thereon in such a manner that the margin of the upper extends away from the insole. The shoe assembly is placed bottom-up on the shoe assembly supporting plate 110 with the last pin 112 entering the conventional last pin hole in the last. The toe portion of the upper and last is supported on the toe rest roller 92 and the forepart portions of the upper margin are inserted between the jaws of the pincers 103. The operator at this time holds the shoe assembly so that the plane of the heel seat portion 194 (FIGURE 10 and 10A) of the insole 158 lies in a substantially horizontal plane which is parallel to the plane of movement during their wiping stroke of wipers that are described below. It may be necessary for the operator to tilt the last with respect to the last pin 112 in order to achieve this if, as is frequently the case, the last pin hole is oversize with respect to the last pin.

Referring to FIGURE 9 which illustrates a portion of the control circuit of the machine, the machine cycle is started by manually shifting a valve 162. This enables pressurized air to pass from a source of pressurized air 164 through a line 166, the valve 162 and a line 168 to the motors 104 to actuate these motors to close the pincers 103 and cause them to grip the forepart portions of the upper margin. Prior to the shifting of the valve 162, the pincers had been maintained in their open position by pressurized air passing to the motors 104 from the valve 162 through a line 170.

The shifting of the valve 162 also enables pressurized air to pass from this valve through a line 172 and a low pressure regulator 174 to actuate the motor 120. Prior to the shifting of the valve 162, the motor 120 had been maintained in its idle condition by pressurized air flowing to this motor from the valve 162, the line 170, a line 176 and a flow control valve 178. The actuation of the motor 120 causes the toe hold-down 136 to move in an arcuate path above the shoe assembly and then downwardly against the forepart of the insole 136, the configuration of the path being determined by the cam tracks 116 and 118. Since the toe hold-down is moved by the motor 120 under the resilient force provided by pressurized air under the relatively low pressure determined by the pressure regulator 174, it will stop its downward movement upon engaging the insole and will exert a relatively light force against the insole. The pivot pin 138 provides a flexible mounting of the hold-down 136 which enables it to rock slightly, if necessary, so that it will bear flushly against the insole and thereby hold the shoe assembly between the toe hold-down 136 and the toe rest 92 with the heel seat portion 194 of the insole maintained in its horizontal plane. At this time the operator can stop holding the shoe assembly. The actuation of the motor 120 to move the hold-down 136 also causes the teeth 140 to rise to a position that is adjacent the teeth 144.

The shifting of the valve 162 also enables pressurized air to pass from the line 172 through a line 180 to a normally closed valve 182.

The valve 182 is now manually opened while the valve 162 remains shifted. This causes pressurized air to pass through the valve 182 and a line 184 to the motor 148 to actuate this motor to swing the pawl 142 counterclockwise (FIGURE 2) against the teeth 140 to thereby lock the hold-down 136 against movement. Prior to the shifting of the valve 182, the pawl 142 had been maintained in its idle position by low pressure air passing from the source 164 through a line 186 and a low pressure regulator 188 to the motor 148. The air entering the motor 148 through the line 184 at full line pressure overcomes the low presssure air in the line 186.

The opening of the valve 182 also enables pressurized air to pass from the line 184 through a line 190 to the motors 38 and 74 to actuate these motors. Prior to the shifting of the valve 182, the motors 38 had been maintained in their idle condition by pressurized air passing to these motors under relatively low pressure through the line 186, the low pressure regulator 188 and a line 191. The air entering the motors 38 at full line pressure through the line 190 overcomes the low pressure air in the line 191. Prior to the shifting of the valve 182, the motor 74 had been maintained with its piston rod retracted under the force of gravity. The actuation of the motors 38 causes the carriage 32 to move forwardly together with the pincers 103 and the actuation of the motor 74 causes the pincers 103 to move upwardly. The forward movement of the pincers causes a firm wrapping of the upper about the heel of the last and the upward movement of the pincers causes the upper to be stretched tightly about the vamp 190 (FIGURE 10B) of the last and also stretches the topline 192 (FIGURE 10A) of the upper tightly on the last. Since the motors 38 and 74 are air actuated they impart resilient and yieldable forces to the upper and the extent of the forward and upward movements imparted to the upper by the pincers will be dependent on the resistance to such movement by the upper, and this is dependent on the material out of which the upper is made and the size and style of the last. The actual direction of movement of the pincers during their upper stretching movement will be the vectorial sum of the components of forward and upward movement and will vary from shoe assembly to shoe assembly. During its stretching movement the upper tends to bear closely against the last vamp 190 since concomitant resilient forward and upward forces are being applied to the pincers 103.

The toe hold-down 136, as described above, is locked against upward movement during the stretching movement of the pincers 103 and applies a minimal downward force to the shoe assembly due to the low pressure of the air entering the motor 120 through the regulator 174. As stated above, the shoe assembly was initially so placed on the support members 110 and 112 that the heel seat portion 194 (FIGURES 10 and 10A) of the insole lies in a horizontal plane that is substantially parallel to the plane of movement of the heel wipers described below and is held in this position by the toe hold-down 136. It is important that the forward and upward movement imparted to the shoe assembly by the pincers 103 does not tilt the shoe assembly about the last pin 112 and thereby cause the insole heel seat portion 194 to move out of its horizontal plane, and this is prevented by the toe hold-down 136 bearing against the forepart portion of the insole 136 opposite the toe rest 92 during the upper stretching movement of the pincers. During this upper stretching movement the vamp portion of the upper will slip forwardly and laterally between the toe rest 92 and last 156. If the downward force applied against the shoe assembly by the toe hold-down 136 were great enough to bind the vamp of the upper between the toe rest 92 and the last vamp portion 190, the stretching operation performed by the pincers 103 would not be satisfactory. It is for this reason that the toe hold-down 136 is locked against upward movement and applies a minimal downward force to the shoe assembly during the stretching movement of the pincers 103. The pressure regulator 174 is so adjusted that the pressurized air applied to the motor 120 moves the toe hold-down 136 against the insole 158 as rapidly as possible while still exerting a downward force that does not bind the vamp of the upper against the toe rest 92 so as to enable the operating cycle of the machine to be as fast as is feasible.

A flow control valve 194 is provided in the line 196 that extends between the line 190 and the motor 74 to enable the motor 74 to move at a slower rate than the motors 38. It has been found desirable to have the vamp of the upper stretched forwardly in the direction of the arrow 198 in FIGURE 10A before it is stretched laterally in the directions of the arrows 200 in FIGURE 10B, and this is provided for by the flow control valve 194. However, it is within the scope of the invention to eliminate the control valve 194.

The remainder of the machine cycle, as described below, is substantially the same as that disclosed in pending application Ser. No. 562,136 filed July 1, 1966.

Figure 11:
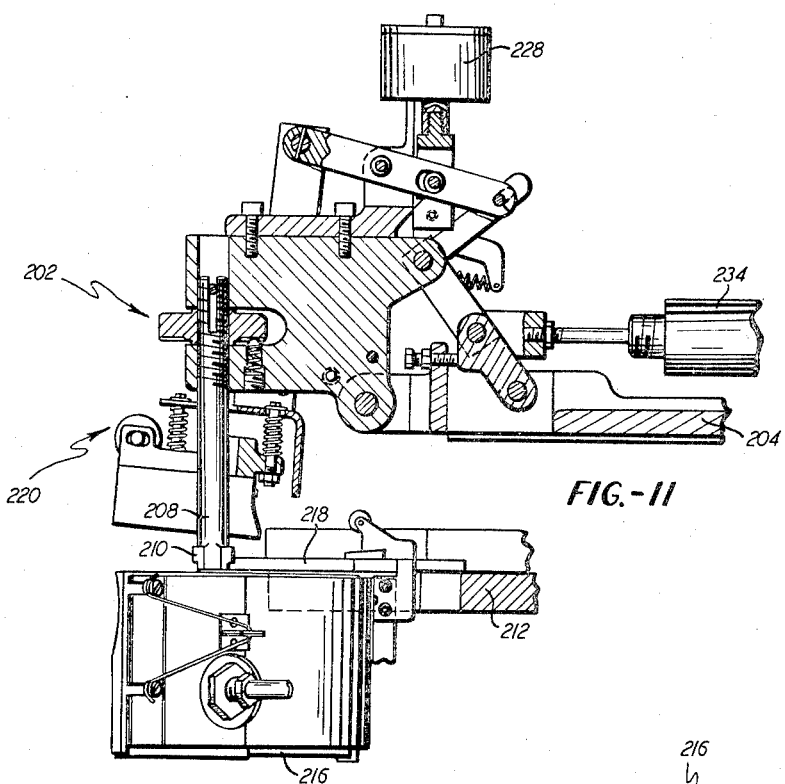

Referring to FIGURES 1 and 11, the machine incorporates a heel hold-down mechanism 202 that includes a hold-down slide 204, the slide 204 being mounted for forward and rearward movement in guides formed in a head cover 206 of the machine. The heel hold-down mechanism comprises a rod 208 having a hold-down foot 210 at its bottom. The machine also incorporates a main slide plate 212 that is located below the slide 204 and is mounted for forward and rearward movement in a head 214 of the machine that is located below the head cover 206. A heel clamp pad 216 is suspended from the main slide plate 212 and extends forwardly thereof. The heel clamp pad 216 is of a substantially U-shaped configuration (see FIGURE 12) and is adapted to embrace the heel end of the shoe assembly. A pair of wipers 218 (only one of which is shown in FIGURE 11) are movably mounted atop the main slide plate 212. A cement extruding applicator 220 is movably mounted to the heel hold-down mechanism 202.

After the above described upper stretching operation of the pincers 103 has been completed, the hold-down slide 204 is caused by a motor 222 (FIGURE 1) to move from an initial rearward position to a forward position such that the heel hold-down foot 210 is positioned directly above the heel portion 194 of the insole 158. After the heel hold-down mechanism 202 has been moved to its forward working position, the motor 20 is caused to be actuated to thereby raise the toe post 22 and the shoe assembly supported thereby until the insole heel portion 194 is brought into abutment with the bottom of the hold-down foot 210.

Figure 12:
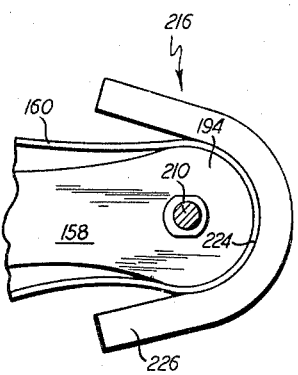
Figure 13:
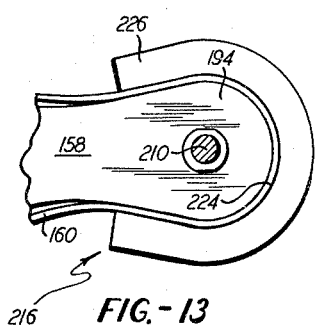

As the toe post 22 rises, a motor (not shown) is activated to move the main slide plate 212 and the heel clamp pad 216 and the wipers 218 supported thereby from an initial out-of-the-way position to a forward working position until the bight 224 of the pad 216 abuts the heel end of the shoe assembly as shown in FIGURE 12. After this, the legs 226 of the heel clamp pad 216 are caused to swing inwardly towards the shoe assembly to thereby press the upper 160 firmly against the heel portion of the last. The parts are now in the position shown in FIGURE 14.

Figure 14:
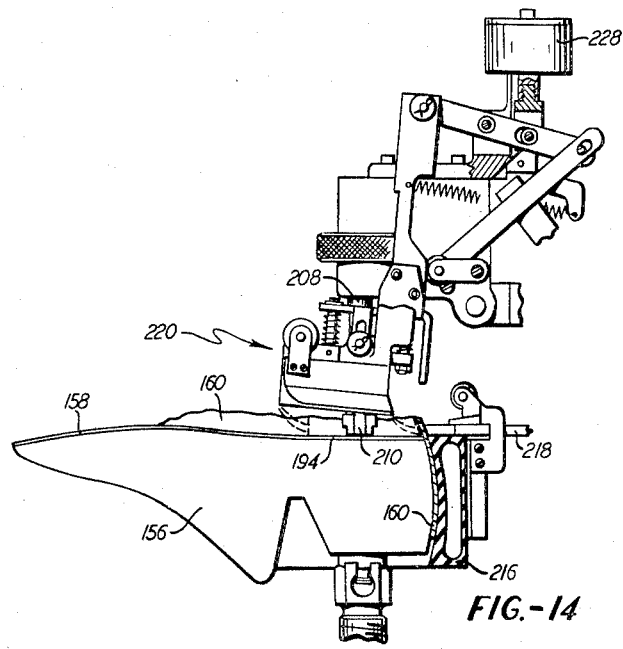
Figure 15:
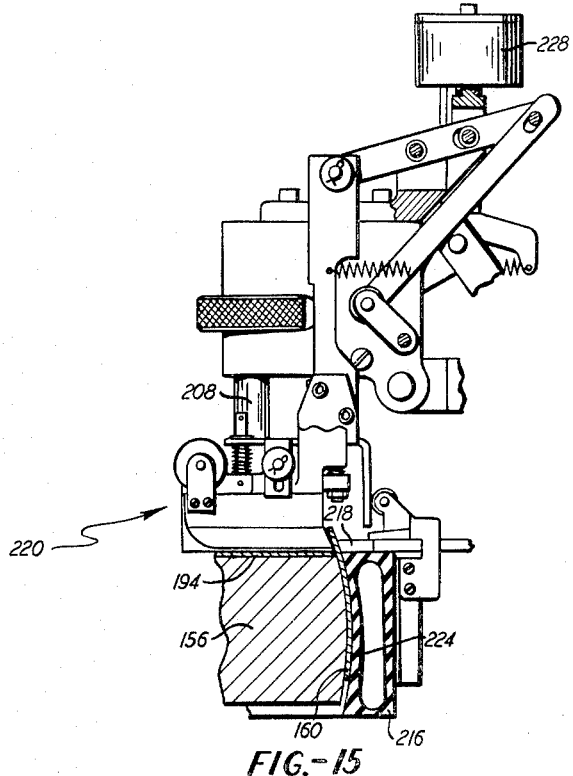

After this, a motor 228 (FIGURE 14) is actuated to move the cement applicator 220 from the FIGURE 14 to the FIGURE 15 position to bring the cement applicator into flush engagement with the periphery of the heel portion 194 of the insole 158. This is followed by an extrusion of a ribbon of cement through the cement applicator 220 against the periphery of the insole heel portion and an actuation of the motor 228 to return the cement applicator to the FIGURE 14 position. Then the wipers 218 are actuated by a motor 230 (FIGURE 1) to move in a wiping stroke forwardly and inwardly in a horizntal plane that is substantially parallel to the plane of the insole heel seat portion 194 to wipe the margin of the heel portion of the upper 160 against the insole and adhesively bond the upper margin and the insole by way of the cement ribbon.

During the latter part of the wiping stroke the valves 162 and 182 are caused to be shifted back to their initial positions. This causes actuation of the motors 104 to open the pincers 103 to release the forepart portion of the upper margin, actuation of the motors 38 and 74 to enable the pincers 103 to be returned to their initial positions and actuation of the motors 148 and 120 to unlock the toe hold-down 136 and return it to its initial position. The flow control valve 178, provided in the line 176, delays the operation of the motor 120 until the motor 148 has acted to disengage the pawl 142 from the teeth 140 to ensure that the toe hold-down 136 is unlocked before it is moved by the motor 120 to its idle position.

At or near the end of the wiping stroke a motor 234 (FIGURE 11) is actuated to effect a raising of the heel hold-down foot 210 from the insole bottom thus transferring the upwardly directed force from the hold-down foot 210 to the bottom surfaces of the wipers 218. At approximately the same time as the heel hold-down foot 210 is raised, air is introduced under increased pressure into motor 20 to cause the wiped upper margin to be pressed onto the insole and the bottom surfaces of the wipers 218 to effect a more permanent bond between the insole and the upper margin. When this increased bedding pressure has been applied for a sufficient length of time, the machine parts that have not already done so are returned to their idle positions and the machine cycle is completed.

I claim:

1. A method for operating on a shoe assembly, that comprises a last having an upper draped thereon and an insole located on its bottom, comprising: supporting the shoe assembly bottom-up by a support arrangement so that the toe of the shoe assembly extends forwardly; supporting the forepart of the shoe assembly by a toe rest that is located forwardly of the support arrangement and that engages the forepart of the upper; applying a hold-down to the forepart of the insole so that the hold-down is locked against upward movement and so that the hold-down does not apply a downward force to the shoe assembly that is great enough to bind the forepart of the upper against the toe rest; and stretching the upper about the last in such a manner that the upper shifts between the last and the toe rest.

2. The method as defined is claim 1 wherein the hold-down is applied to the insole under a yieldable force that is so regulated as to not be great enough to effect said binding and the hold-down is thereafter locked against upward movement.

3. The method as defined in claim 1 wherein the upper is stretched about the last by gripping a vamp portion of the upper and concomitantly applying a yieldable forward force and a yieldable upward force to the gripped vamp portion.

4. The method as defined in claim 3 wherein the gripping means is moved forwardly by said forward force at a greater speed than it is moved upwardly by said upward force.

5. A machine for operating on a shoe assembly, that comprises a last having an upper draped thereon and an insole located on its bottom, comprising: a support arrangement for supporting the shoe assembly bottom-up with its toe extending forwardly; a toe rest located forwardly of the support arrangement adapted to engage the forepart of the upper and support the forepart of the shoe assembly; a gripping means positioned above the toe rest and mounted for movement from an initial position in a path that extends away from the toe rest; a toe hold-down mounted for movement from a starting position remote from the insole in a path that extends toward the forepart of the insole: resilient hold-down drive means for imparting said movement to the toe hold-down; regulating means for adjusting the force imparted to the toe hold-down by the hold-down drive means; locking means actuable to lock the toe hold-down against upward movement after it has been moved toward the insole by the hold-down drive means; means for initially maintaining the gripping means in its initial position; means for initially maintaining the toe hold-down in its starting position; means for initially maintaining the locking means in unactuated condition; means for causing the gripping means to grip the margin of the vamp of the upper; means for actuating the hold-down drive means to move the toe hold-down from its starting position and bring it to bear against the forepart of the insole under an adjusted force determined by the regulating means that is not great enough to bind the forepart of the upper against the toe rest; means for thereafter actuating the locking means to thereby lock the toe hold-down against upward movement; and means for thereafter causing the gripping means to move away from its initial position to thereby stretch the upper about the last in such a manner that the upper shifts between the last and toe rest.

6. The machine as defined in claim 5 wherein the hold-down drive means comprises: an air actuated motor; means operatively connecting the motor to the toe hold-down; and means for supplying pressurized air to the motor; and the regulating means comprises a pressure regulator for regulating the pressure of said air.

7. The machine as defined in claim 5 further comprising: a housing; a carrier mounted for movement with respect to the housing; means connecting the toe hold-down to the carrier; means connecting the carrier to said hold-down drive means so as to be moved in response to the actuation of the hold-down drive means; a locking surface associated with the carrier for movement therewith; a locking member, which acts as said locking means, position alongside the path of movement of the locking surface; means mounting the locking member for movement toward and away from the locking surface; means so constructing and arranging the locking surface and the locking member that they are disposed adjacent each other when the toe hold-down is bearing against the insole; means for initially maintaining the locking member in a position that is spaced from the locking surface; and means for moving the locking member against the locking surface when the locking member and the locking surface are disposed opposite each other to thereby cause said locking of the toe hold-down.

8. The machine as defined in claim 5 further comprising: a holder; means connecting the holder to the hold-down drive means; and means providing a flexible mounting of the toe hold-down to the holder whereby the hold-down conforms to the plane of the forepart of the insole when brought to bear thereagainst.

9. The machine as defined in claim 5 further comprising: means mounting the gripping means for forward and upward movement; a first yieldable gripping means drive means operatively connected to the gripping means to impart forward movement to the gripping means; a second yieldable gripping means drive means operatively connected to the gripping means to impart upward movement to the gripping means; means for initially causing the first and second gripping means drive means to maintain the gripping means in said initial position thereof by maintaining the gripping means in a rearward and downward position; and means for concomitantly actuating both gripping means drive means to concomitantly move the gripping means forwardly and upwardly under yieldable forces to thereby cause said movement of the gripping means away from its initial position.

10. The machine as defined in claim 9 further comprising: means for causing the first gripping means drive means to move the gripping means at a greater speed than the second gripping means drive means.

11. A machine for operating on a shoe assembly, that comprises a last having an upper draped thereon and an insole located on its bottom, comprising: a support arrangement for supporting the shoe assembly bottom-up with its toe extending forwardly; a gripping means positioned above the toe rest; means mounting the gripping means for forward and upward movement from an initial position; a first yieldable gripping means drive means operatively connected to the gripping means to impart forward movement to the gripping means; a second yieldable gripping means drive means operatively connected to the gripping means to impart upward movement to the gripping means; means for initially causing the first and second gripping means drive means to maintain the gripping means in said initial position thereof by maintaining the gripping means in a rearward and downward position; means for causing the gripping means to grip the margin of the vamp of the upper; and means for thereafter concomitantly actuating both gripping means drive means to concomitantly move the gripping means forwardly and upwardly under yieldable forces from said initial position and stretch the upper about the last.

12. The machine as defined in claim 11 further comprising: means for causing the first gripping means drive means to move the gripping means at a greater speed than the second gripping means drive means.

13. The machine as defined in claim 11 further comprising: a toe rest located forwardly of the support arrangement and below the gripping means adapted to support the forepart of the shoe assembly; a toe hold-down mounted for movement from a starting position remote from the insole in a path that extends toward the forepart of the insole; hold-down drive means for imparting said movement to the toe hold-down; means for initially maintaining the toe hold-down in its starting position; and means, operative prior to the actuation of said yieldable drive means, for actuating the hold-down drive means to move the toe hold-down from its starting position and bring it to bear against the fore-part of the insole.

14. The machine as defined in claim 11 further comprising: a toe rest located forwardly of the support arrangement and below the gripping means adapted to engage the forepart of the upper and support the forepart of the shoe assembly; a toe hold-down mounted for movement from a starting position remote from the insole in a path that extends toward the insole; resilient hold-down drive means for imparting said movement to the toe hold-down; regulating means for adjusting the force imparted to the toe hold-down by the hold-down drive means; locking means actuable to lock the toe hold-down against upward movement after it has been moved toward the insole by the hold-down drive means; means for initially maintaining the toe hold-down in its starting position; means for initially maintaining the locking means in unactuated condition; means, operative prior to the actuation of said gripping means drive means, for actuating the hold-down drive means to move the toe hold-down from its starting position and bring it to bear against the fore-part of the insole under an adjusted force determined by the regulating means that is not great enough to bind the forepart of the upper against the toe rest; and means, operative subsequent to the actuation of the gripping means drive means and prior to the actuation of the hold-down drive means, for actuating the locking means to lock the toe hold-down against upward movement; said concomitant forward and upward movement of the gripping means causing the upper to be stretched about the last in such a manner that the upper is shifted between the last and the toe rest.

15. The machine as defined in claim 14 wherein the hold-down drive means comprises: an air actuated motor; means operatively connecting the motor to the toe hold-down; and means for supplying pressurized air to the motor; and the regulating means comprises a pressure regulator for regulating the pressure of said air.

16. The machine as defined in claim 14 further comprising: a housing: a carrier mounted for movement with respect to the housing; means connecting the toe hold-down to the carrier; means connecting the carrier to said hold-down drive means so as to be moved in response to the actuation of the hold-down drive means; a locking surface associated with the carrier for movement therewith; a locking member, which acts as said locking means, positioned alongside the path of movement of the locking surface; means mounting the locking member for movement toward and away from the locking surface; means so constructing and arranging the locking surface and the locking member that they are disposed adjacent each other when the toe hold-down is bearing against the insole; means for initially maintaining the locking member in a position that is spaced from the locking surface; and means for moving the locking member against the locking surface when the locking member and the locking surface are disposed opposite each other to thereby cause said locking of the toe hold-down.

17. The machine as defined in claim 14 further comprising: a holder; means connecting the holder to the drive means; and means providing a flexible mounting of the toe hold-down to the holder whereby the hold-down conforms to the plane of the forepart of the insole when brought to bear thereagainst.

18. A method for operating on a shoe assembly, that comprises a last having an upper draped thereon and an insole located on its bottom, comprising: supporting the shoe assembly bottom-up by a support arrangement so that the toe of the shoe assembly extends forwardly; gripping the vamp of the upper with gripping means; and thereafter concomitantly applying a yieldable forward force and a yieldable upward force to the gripping means to concomitantly move the gripping means forwardly and upwardly and stretch the upper about the last.

19. The method as defined in claim 18 wherein the gripping means is moved forwardly at a greater speed than it is moved upwardly.

20. The method as defined in claim 18 further comprising: supporting the forepart of the shoe assembly by a toe rest that is located forwardly of the support arrangement; and applying a hold-down to the forepart of the shoe assembly prior to the application of said yieldable forward and upward forces.

21. The method as defined in claim 18 further comprising: supporting the forepart of the shoe assembly by a toe rest that is located forwardly of the support arrangement and that engages the forepart of the upper; and, prior to the application of said yieldable forward and upward forces, applying a hold-down to the forepart of the insole so that the hold-down is locked against upward movement and so that the hold-down does not apply a downward force to the shoe assembly that is great enough to bind the forepart of the upper against the last; said concomitant forward and upward movements of the gripping means causing the upper to be stretched about the last in such a manner that the upper is shifted between the last and the toe rest.

22. The method as defined in claim 21 wherein the hold-down is applied to the insole under a yieldable force that is so regulated as to not be great enough to effect said binding and the hold-down is thereafter locked against upward movement.

References Cited
UNITED STATES PATENTS

| | | | |
|---|---|---|---|
| 3,241,164 | 3/1966 | Kamborian | 12—10.1 |
| 3,332,096 | 7/1967 | Kamborian et al. | 12—10.5 |
| 3,404,416 | 10/1968 | Stein et al. | 12—10.5 |

PATRICK D. LAWSON, Primary Examiner

U.S. Cl. X.R.

12—10.5

PO-1050
(5/69)

UNITED STATES PATENT OFFICE
CERTIFICATE OF CORRECTION

Patent No. 3,484,880　　　　　　　Dated Dec. 23, 1969

Inventor(s) Normand Bergeron

It is certified that error appears in the above-identified patent and that said Letters Patent are hereby corrected as shown below:

Column 8: line 45, change "toe rest" to --support arrangement--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents